United States Patent
Zhang et al.

(10) Patent No.: US 9,965,156 B2
(45) Date of Patent: May 8, 2018

(54) PUSH-PULL TYPE GESTURES

(71) Applicant: Adobe Systems Incorporated, San Jose, CA (US)

(72) Inventors: Yongchao Zhang, Beijing (CN); Ying Liu, Beijing (CN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 394 days.

(21) Appl. No.: 14/983,146

(22) Filed: Dec. 29, 2015

(65) Prior Publication Data
US 2016/0132218 A1 May 12, 2016

Related U.S. Application Data

(63) Continuation of application No. 14/149,135, filed on Jan. 7, 2014, now Pat. No. 9,268,484.

(51) Int. Cl.
*G06F 3/0484* (2013.01)
*G06F 3/0488* (2013.01)
*G06F 3/0489* (2013.01)
*G06F 3/0481* (2013.01)
*G06F 3/0482* (2013.01)
*G06F 17/24* (2006.01)

(52) U.S. Cl.
CPC ........ *G06F 3/04842* (2013.01); *G06F 3/0482* (2013.01); *G06F 3/04812* (2013.01); *G06F 3/04845* (2013.01); *G06F 3/04883* (2013.01); *G06F 3/04895* (2013.01); *G06F 17/24* (2013.01); *G06F 2203/04801* (2013.01)

(58) Field of Classification Search
CPC .................................................. G06F 3/04842
USPC ........................................................ 715/863
See application file for complete search history.

(56) References Cited

U.S. PATENT DOCUMENTS

| | | | | |
|---|---|---|---|---|
| 6,259,436 B1 * | 7/2001 | Moon | ................... | G06F 3/0488 345/173 |
| 6,331,840 B1 * | 12/2001 | Nielson | ................. | G06F 3/0488 345/1.1 |
| 6,545,669 B1 * | 4/2003 | Kinawi | ................. | G06F 3/0486 345/1.1 |

(Continued)

OTHER PUBLICATIONS

"Notice of Allowance", U.S. Appl. No. 14/149,135, dated Nov. 17, 2015, 15 pages.

*Primary Examiner* — Reza Nabi
(74) *Attorney, Agent, or Firm* — Wolfe-SBMC

(57) ABSTRACT

Techniques for push-pull type gestures are described. In embodiments, a push gesture away from a cursor object that is displayed by a display device is recognized. An assisted location object is then displayed to assist a user in repositioning the cursor object based on the push gesture. In implementations, a prompt gesture is recognized effective to cause a prompt object having one or more options to be displayed. The options that are displayed are selectable to initiate a function that is operable using the cursor object. In addition, a motion select gesture that selects one of the options is recognized effective to replace the prompt object and initiate a function corresponding to the selected option. Also, selected text is automatically divided into a plurality of vertical sections that are individually selectable to include or exclude when performing a subsequent function, and then the subsequent function is performed.

20 Claims, 11 Drawing Sheets

(56) References Cited

U.S. PATENT DOCUMENTS

| | | | | |
|---|---|---|---|---|
| 7,535,461 B2* | 5/2009 | Ito | G06F 3/038 | 345/173 |
| 9,019,210 B2* | 4/2015 | Qian | G06F 3/04886 | 345/173 |
| 9,268,484 B2 | 2/2016 | Zhang et al. | | |
| 2005/0076300 A1* | 4/2005 | Martinez | G06F 17/218 | 715/272 |
| 2006/0161846 A1* | 7/2006 | Van Leeuwen | G06F 3/04842 | 715/702 |
| 2009/0228837 A1* | 9/2009 | Suzuki | B60K 35/00 | 715/841 |
| 2009/0319935 A1* | 12/2009 | Figura | G06F 3/04886 | 715/773 |
| 2010/0026640 A1* | 2/2010 | Kim | G06F 3/0414 | 345/173 |
| 2010/0050076 A1* | 2/2010 | Roth | G06F 3/04883 | 715/702 |
| 2010/0251176 A1* | 9/2010 | Fong | G06F 3/04886 | 715/821 |
| 2011/0069012 A1* | 3/2011 | Martensson | G06F 3/04847 | 345/173 |
| 2011/0115413 A1* | 5/2011 | Erickson | H05B 37/029 | 315/312 |
| 2012/0146945 A1* | 6/2012 | Miyazawa | G01C 21/3664 | 345/174 |
| 2012/0169634 A1* | 7/2012 | Lee | G06F 3/04883 | 345/173 |
| 2012/0229493 A1* | 9/2012 | Kim | G06F 3/04883 | 345/589 |
| 2012/0249595 A1* | 10/2012 | Feinstein | G06F 1/1694 | 345/642 |
| 2013/0132878 A1* | 5/2013 | Tijssen | G06F 3/0488 | 715/770 |
| 2014/0078066 A1* | 3/2014 | Locker | G06F 3/04883 | 345/173 |
| 2014/0137039 A1* | 5/2014 | Kroeger | G06F 3/04817 | 715/810 |
| 2014/0267094 A1* | 9/2014 | Hwang | G06F 3/0488 | 345/173 |
| 2014/0267130 A1* | 9/2014 | Hwang | G06F 3/0488 | 345/174 |
| 2014/0354557 A1* | 12/2014 | Shen | G06F 3/04842 | 345/173 |
| 2015/0067495 A1* | 3/2015 | Bernstein | G06F 3/016 | 715/702 |
| 2015/0067513 A1* | 3/2015 | Zambetti | G06F 3/0482 | 715/716 |
| 2015/0067560 A1* | 3/2015 | Cieplinski | G06F 3/04842 | 715/765 |
| 2015/0143273 A1* | 5/2015 | Bernstein | G06F 3/04817 | 715/767 |
| 2015/0153929 A1* | 6/2015 | Bernstein | G06F 3/0481 | 715/781 |
| 2015/0193140 A1* | 7/2015 | Zhang | G06F 3/04883 | 715/863 |

* cited by examiner

PUSH-PULL TYPE GESTURES

RELATED APPLICATION

This application is a continuation of and claims priority to U.S. patent application Ser. No. 14/149,135 filed Jan. 7, 2014, entitled "Push-Pull Type Gestures", the disclosure of which is incorporated by reference herein in its entirety.

BACKGROUND

Conventional techniques used for word processing may have limited functionality with respect to cursor manipulation, particularly for mobile and/or touch input devices. In one example, a user's finger may not provide pinpoint accuracy for repositioning the cursor on a touch screen device. The lack of accuracy in this example may be a result of the user's finger contacting an area of the touch screen device rather than a point on the touch screen device. These and other limitations may adversely affect the accuracy of the cursor manipulation. Consequently, the time needed to manipulate the cursor may be increased, and/or a number of user attempts to manipulate the cursor in a manner desired may be increased, thereby causing user frustration.

SUMMARY

Techniques for push-pull type gestures are described. In one or more embodiments, a push gesture away from a cursor object that is displayed by a display device is recognized. An assisted location object is then displayed to assist a user in repositioning the cursor object based on the push gesture. In implementations, a prompt gesture is recognized effective to cause a prompt object having one or more options to be displayed. The options that are displayed are selectable to initiate a function that is operable using the cursor object. In addition, a motion select gesture that selects one of the options is recognized effective to replace the prompt object and initiate a function corresponding to the selected option.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
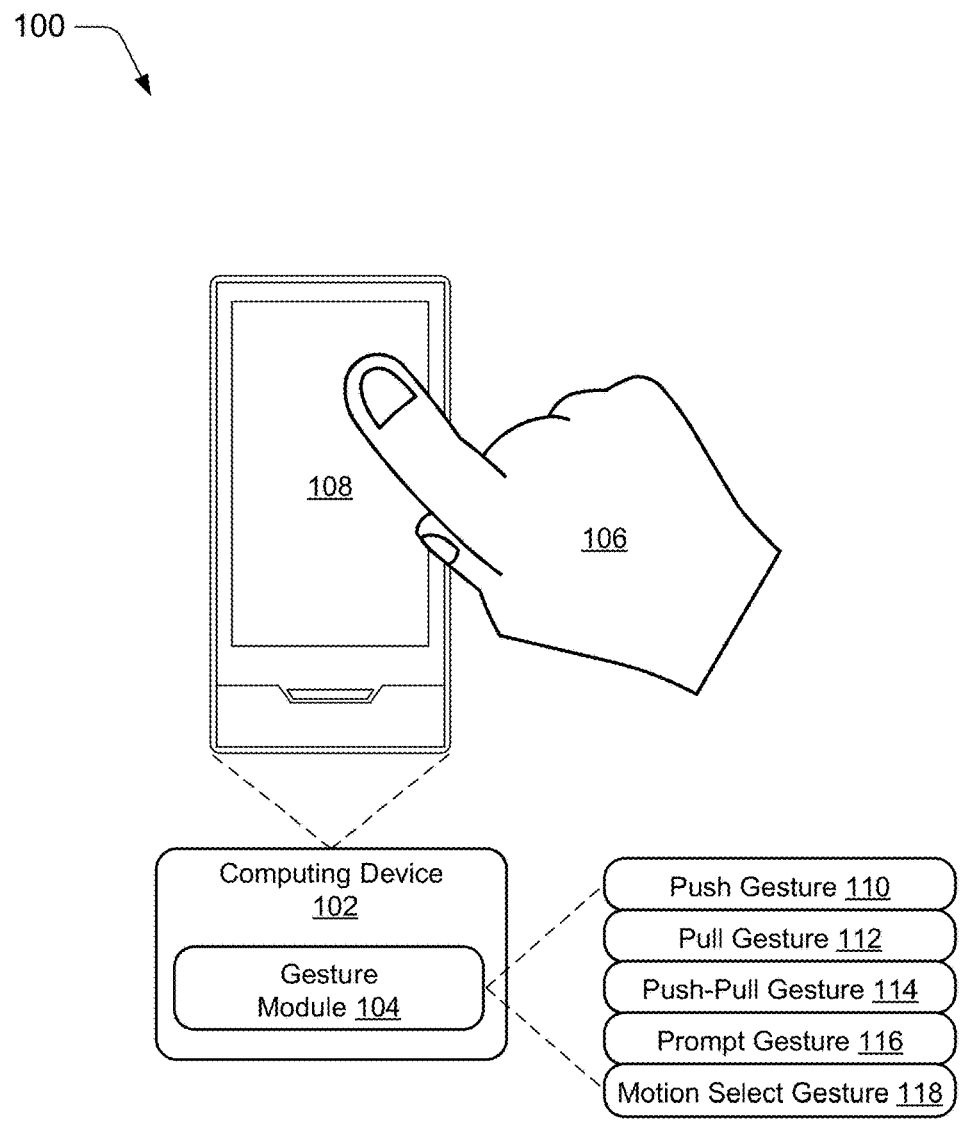
FIG. 1 is an illustration of an environment in an example implementation that is operable to employ techniques for push-pull type gestures.

Conventional techniques used for word processing may be inefficient in some devices. For example, a touch screen on a mobile device can be used to enter an input, such as a cursor location input. A user can touch the touch screen using a finger to indicate a location for the cursor. However, based on a size of the finger, the finger may contact an area of the touch screen rather than a single point. Because the user actually touches an area of the touch screen, the device may have difficulty accurately identifying an intended location for the cursor, and may "guess" the intended location incorrectly. Further, a user might touch the screen several times before finally pinpointing the exact location desired for the cursor. This can be frustrating for the user as well as time consuming.

Techniques involving push-pull type gestures are described. In the following discussion, a variety of different implementations are described that involve improved functionalities for word processing applications. In one example, a user can use a finger to input, via a touch screen, multiple different commands to cause multiple different operations to be performed, without lifting the user's finger from the touch screen. In addition, using the techniques described herein, the user can more accurately and efficiently than with conventional techniques, reposition the cursor on a touch screen device and perform a variety of operations, such as text select, copy, paste, move, and so on.

As used herein, the term "gesture" may refer to a touch input, such as a finger of a user's hand proximate a display device of a computing device using touchscreen functionality. The touch input may be recognized as including attributes (e.g., movement, selection point, size, etc.) that are usable to differentiate the touch input from other touch inputs. This differentiation may then serve as a basis to identify a gesture from the touch input and consequently an operation that is to be performed based on the identification of the gesture.

As used herein, a "push gesture" may define a gesture that includes movement of a touch input in a direction away from a displayed object, such that the user touches the display device proximate an object and "pushes" away from the object, or drags the finger away from the object. A "pull gesture" may be recognized as a touch input that includes movement towards a displayed object such that the user touches the display device at a location distal from the object and "pulls" towards the object, or drags the finger to the object. A "push-pull gesture" may be recognized as a "push" away from the object and a "pull" back toward the object. Further discussion of these gestures is provided below.

A "prompt gesture" may define a gesture that is effective to initiate a command prompt. The prompt gesture may include a push gesture, a pull gesture, a push-pull gesture, or any other suitable gesture that is effective to initiate the command prompt. In one embodiment, a prompt gesture may include a push gesture away from a cursor object to initiate display of a command prompt that may prompt a user to select a command associated with a function. In one or more embodiments, the prompt gesture may include an arc motion directed partially around the cursor object to initiate display of the command prompt. Further discussion of the prompt gesture is provided below.

A "motion select gesture" may define a gesture that includes motion effective to select a selectable object. The motion select gesture may include a push gesture, a pull gesture, a push-pull gesture, or any other suitable gesture that is effective to select an object. Further discussion of the motion select gesture is provided below.

As used herein, a "document" may define a record of information, such as text, images, and other data. The document may include an electronic document that can be created in any type of available format. A document can include a variety of different mediums via which to provide information to a user.

In the following discussion, an example environment is first described that may employ the techniques described herein. Following this, example implementations are described that employ the techniques described herein. Example procedures are then described which may be performed in the example environment as well as other environments. Consequently, performance of the example procedures is not limited to the example environment and/or the example implementations, and the example environment and/or the example implementations are not limited to performance of the example procedures.

Example Environment

FIG. 1 is an illustration of an environment 100 in an example implementation that is operable to employ techniques described herein. The illustrated environment 100 includes an example of a computing device 102 that may be configured in a variety of ways. For example, the computing device 102 may be configured as a desktop computer, a laptop computer, a mobile device (e.g., assuming a handheld configuration such as a tablet or mobile phone), and so forth. Thus, the computing devices may range from full resource devices with substantial memory and processor resources (e.g., personal computers, game consoles) to a low-resource device with limited memory and/or processing resources (e.g., mobile devices). The computing device 102 may also relate to software that causes the computing device 102 to perform one or more operations.

The computing device 102 is illustrated as including a gesture module 104. The gesture module 104 is representative of functionality to identify gestures and cause operations to be performed that correspond to the gestures. The gestures may be identified by the gesture module 104 in a variety of ways. For example, the gesture module 104 may be configured to recognize a touch input, such as a finger of a user's hand 106 as proximate a display device 108 of the computing device using touchscreen functionality.

The touch input may also be recognized as including attributes (e.g., selection point, movement, etc.) that are usable to differentiate the touch input from other touch inputs recognized by the gesture module 104. This differentiation may then serve as a basis to identify a gesture from the touch inputs and consequently an operation that is to be performed based on the identification of the gesture. A variety of different types of gestures may be recognized by the gesture module 104, such as gestures that are recognized from a single type of input (e.g., touch gestures that include an interrupt, such as the user's finger lifting off of the display device 108) as well as gestures involving multiple types of inputs.

For example, in at least one embodiment described herein, the computing device 102 may be configured to detect and differentiate between multiple different gestures without an interrupt between gestures. From the user's perspective, the user's finger may maintain continuous contact with the display device while inputting multiple different gestures to execute multiple different operations.

Accordingly, the gesture module 104 may support a variety of different gestures. Examples of gestures described herein include a push gesture 110, a pull gesture 112, a push-pull gesture 114, a prompt gesture 116, and a motion select gesture 118. Each of these gestures is described in further detail below.

Having described example operating environments in which the inventive principles can be employed, consider now a discussion of various implementations.

Example Implementations

The following discussion describes example graphical user interfaces (GUIs) that can be employed to perform various aspects of techniques discussed herein in accordance with one or more embodiments. The example GUIs may be employed in the environment 100 of FIG. 1, the system 1100 of FIG. 11, and/or any other suitable environment.

Figure 2:
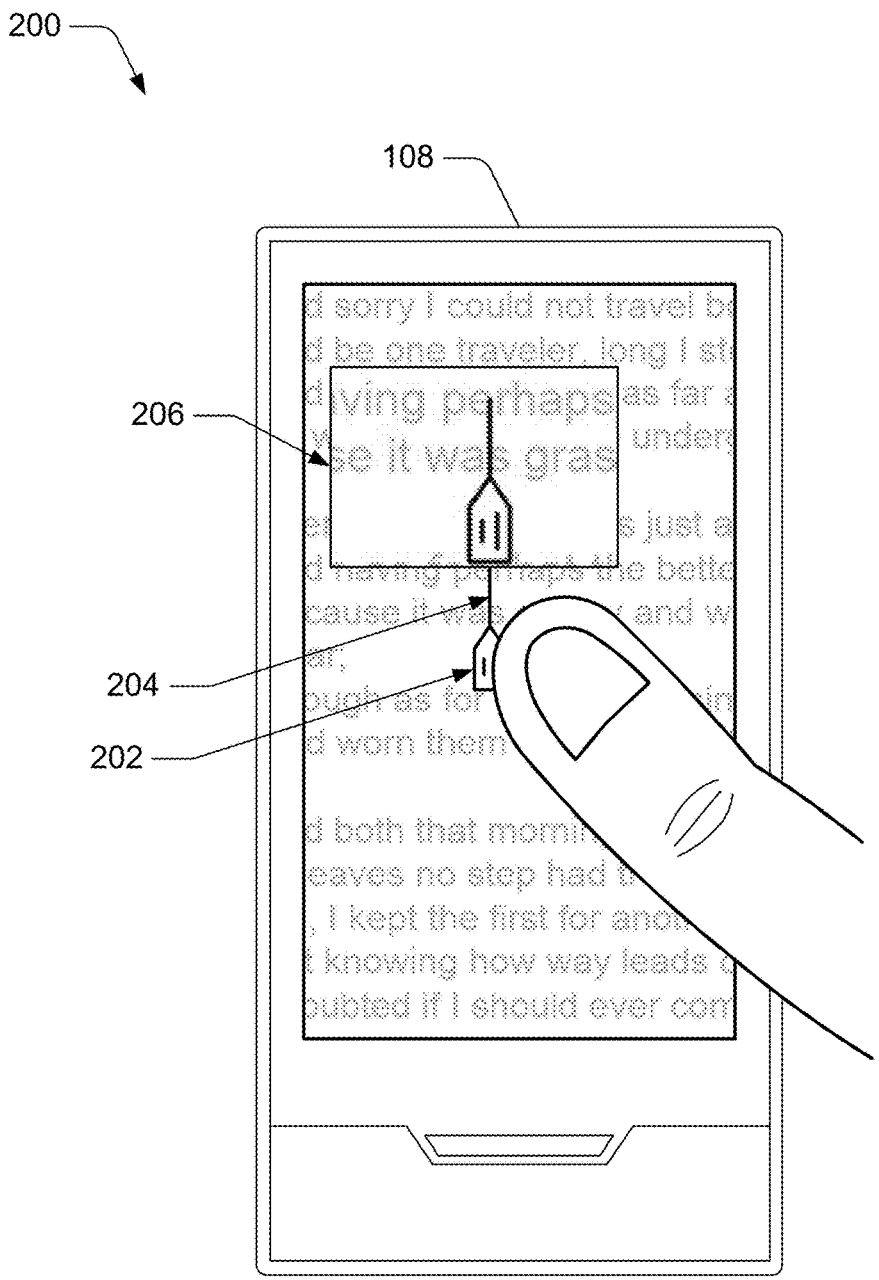
FIG. 2 is an illustration of an example implementation in which techniques for push-pull type gestures are employed in accordance with one or more embodiments.

FIG. 2 is an illustration of an example graphical user interface (GUI) 200 that can be implemented according to various embodiments discussed herein. For example, the GUI 200 can be implemented as a browser that is configured to access a database of files or other data that is local to the computing device 102 or remote from the computing device 102. The GUI 200 can also be representative of network access functionality that may be incorporated as part of an application, e.g., to provide network-based functionality as part of the application, an operating system, and so on. In at least some embodiments, the GUI 200 may be implemented by the gesture module 104 of FIG. 1 to provide a visual feedback associated with one or more gestures received via a touch screen device. In at least one embodiment, a user can initiate contact with a display device using touch screen functionality to input one or more gestures. In a word processing application, the user may initiate contact with the display device to indicate a location for a cursor.

Utilizing techniques described herein, a cursor object 202 may be displayed with a cursor 204 in response to the user initiating contact with the display device. In implementations, the cursor object 202 and the cursor 204 may be combined as a single object. Accordingly, discussion of the cursor object 202 herein may refer to one or both of the cursor object 202 and/or the cursor 204. Alternatively, the cursor object 202 and the cursor 204 may be separate objects associated with one another. The user may use any of a variety of input items to provide inputs via the display device. Some examples of input items may include a finger, a hand, a stylus, or any other suitable item that is usable to provide an input via a display device using touch screen functionality.

In at least some embodiments, the cursor object 202 and a portion of data (e.g., text) displayed on the display device may be magnified (e.g., "zoomed in") to enlarge the display for easy viewing by the user. For example, a window may be generated proximate to the cursor object 202 to display a magnified version of the text that is proximate to the cursor object 202. In some embodiments, the window may be displayed in a location that is not obscured by the user's finger. This may allow the user to more clearly view the location of the cursor object 202 in relation to the text. Once the cursor object 202 is displayed, the user may reposition the cursor object 202 using the techniques described herein.

Figure 3:
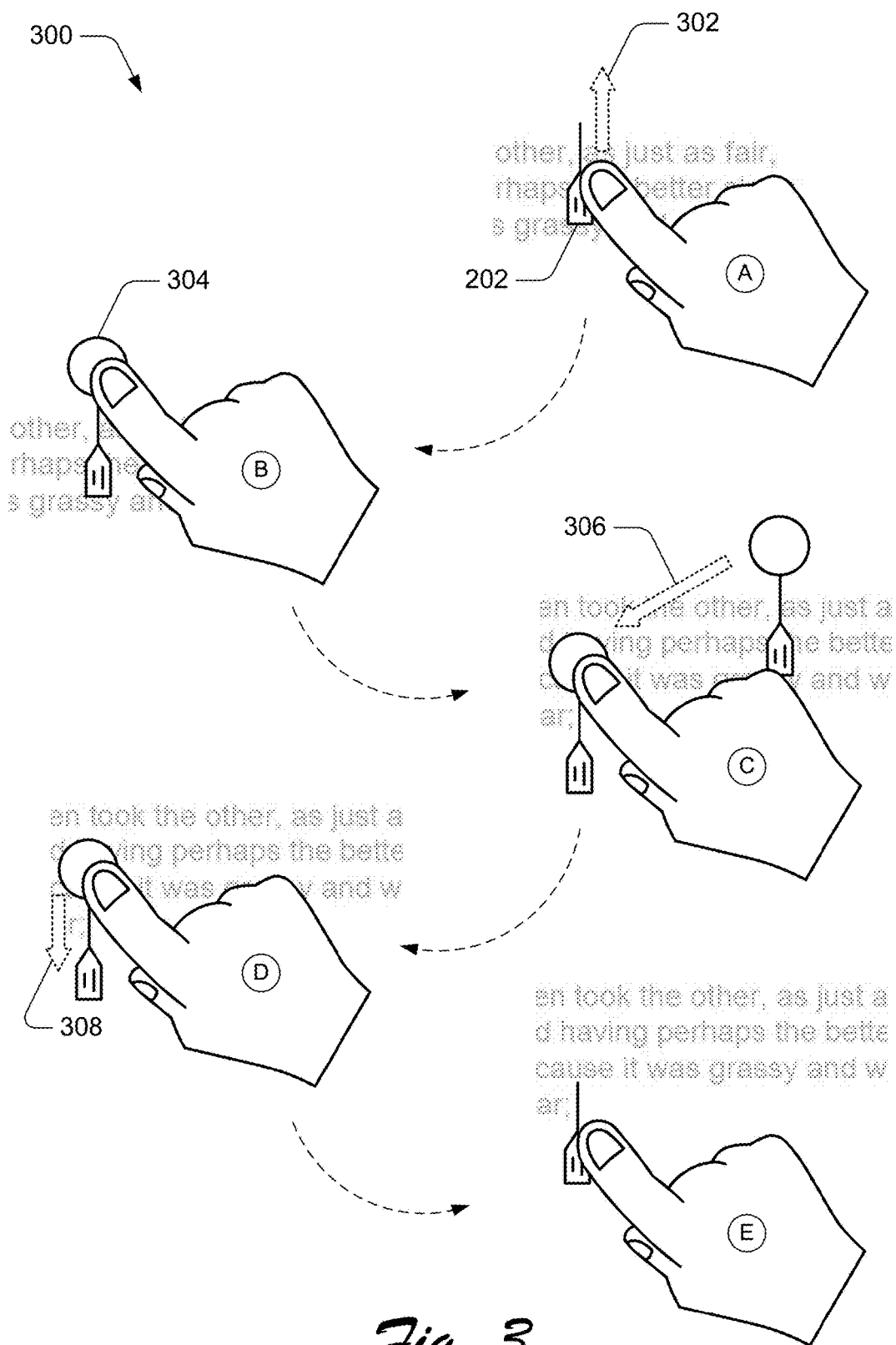
FIG. 3 is an illustration of an example implementation in which techniques for push-pull type gestures are employed in association with a cursor object.

Consider now a discussion of FIG. 3, which is an illustration of an example implementation 300 in which techniques for push-pull type gestures are employed in association with a cursor object. FIG. 3 illustrates a series of inputs that can be recognized as gestures or other inputs to define a cursor location. Although the following inputs are illustrated as a series of inputs, these inputs are not necessarily limited to the order shown for performing the described operations.

In implementations, a push gesture can be recognized away from the cursor object 202. For example, the user's finger in example "A" may swipe or drag upward away from the cursor object 202 as indicated by arrow 302. This motion may be referred to as a push gesture because the user "pushes" away from the cursor object 202. In response to the push gesture, an assisted location object 304 is displayed in the user interface proximate the cursor object 202, as illustrated in example "B". The assisted location object 304 may include any of a variety of objects, such as a shape, an icon, an image, text, or any other suitable object usable as a target for an input item on the display device. By way of example and not limitation, the assisted location object 304 is illustrated in example "B" as a circle that is sized according to the user's finger. In addition, the push gesture may initiate a cursor location function to enable the cursor object 202 to be repositioned to a different location on the display device.

In implementations, one or more characteristics of the assisted location object 304 may be adjusted based on the input item used to input one or more of the gestures. For example, the assisted location object 304 can be increased in size to correspond to the user's finger if an area of the display device contacted by the user's finger is relatively large. In embodiments, the assisted location object 304 may be decreased in size for a stylus that contacts a relatively small area of the display device. The assisted location object 304 may be adjusted automatically or responsive to a user input. In this way, the user may more easily target the assisted location object 304 with the input item, based on which input item is used.

In at least one embodiment, the user may drag the assisted location object 304 to a desired location, and the cursor object 202 will follow. An example is shown in example "C", where the assisted location object 304 is moved (arrow 306) to a new location on the display device. Accordingly, the user may specify a new location for the cursor object 202 without the finger blocking a user's view of the cursor object 202 on the user interface. Once the cursor object 202 has been relocated to the new location, a pull gesture can be recognized that "pulls" toward the cursor object 202, as indicated by arrow 308 in example "D". In response to the pull gesture, the assisted location object 304 is removed from the user interface, as illustrated in example "E," and the cursor location function is terminated.

At this point, the user may remove the input item from contact with the display device, and the cursor object 202 remains in the new location. The user may then input an additional gesture or command to initiate an additional function. Alternatively, the user may initiate a new gesture without the input item being removed from contact with the display device. In this way, multiple gestures can be received by the computing device as a continuous touch input without interruption of, or between, the gestures or inputs. As described above, once the cursor object 202 is located in an intended desired location, an additional gesture or command may be input, as described in FIG. 4.

Figure 4:
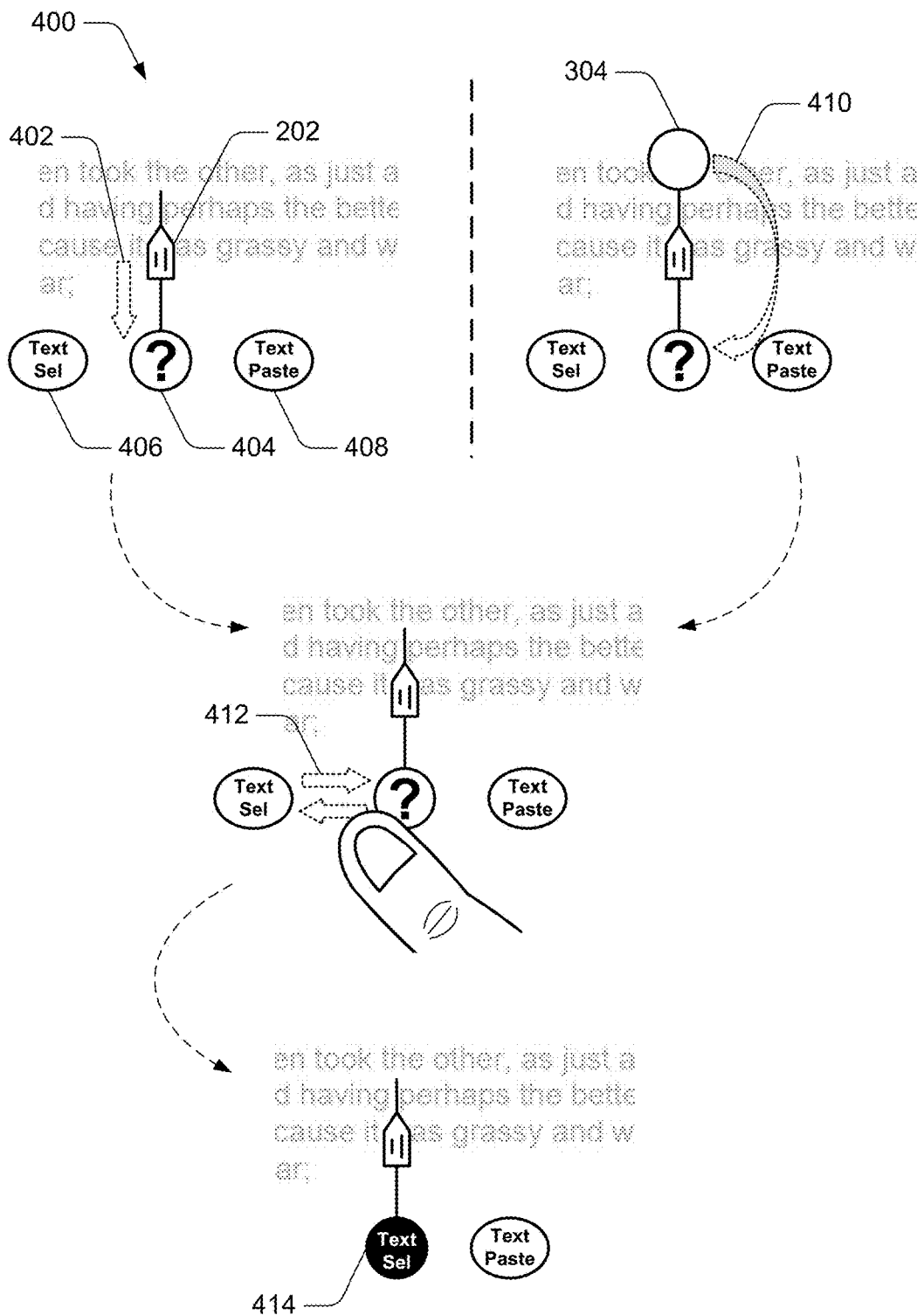
FIG. 4 is an illustration of an example implementation in which techniques for push-pull type gestures are employed in accordance with a prompt gesture and/or a motion select gesture.

FIG. 4 is an illustration of an example implementation 400 in which techniques for push-pull type gestures are employed in accordance with a prompt gesture or a motion select gesture. The prompt gesture can be implemented in a variety of ways. In embodiments, the prompt gesture can include a pull gesture that pulls away from the cursor object 202, as illustrated by arrow 402 in the upper left image of FIG. 4, in a direction that is different than the push gesture that initiates the assisted location object 304 described in relation to FIG. 3. In some embodiments, the prompt gesture may include a pull gesture that pulls toward the user from the cursor object 202. For instance, a user using a mobile device may pull downward from the cursor object 202, as illustrated by arrow 402, toward the user's body.

In response to the prompt gesture, display of a prompt object 404 is initiated. Any suitable object may be used to represent the prompt object 404, such as an icon, text, an image, or any combination thereof. By way of example and not limitation, the prompt object 404 is illustrated as a circle with a question mark. In at least some embodiments, the prompt object 404 includes one or more options. Each option can be configured to represent a function, such as an operation, action, or command to be executed and/or performed. In implementations, the function is operable at least partially using the cursor object 202 or a location of the cursor object 202. For example, a text select option 406 and/or a text paste option 408 can be displayed with the prompt object 404.

The text select option 406 is representative of a function that enables a user to select text or other data displayed on the display device, further details of which are described below. The text paste option 408 is representative of a function to paste previously copied data, such as text. If no data has been previously copied, then the text paste option 408 may not be displayed as a selectable option.

An example of an alternative prompt gesture is illustrated in the upper right image of FIG. 4. Here, the prompt gesture may be initiated directly from the assisted location object 304 while the cursor location function is active. For example, a user may swipe or drag the input item directly from the assisted location object 304 in an arc motion directed around the cursor object 202 to an opposing side of the cursor object 202, as illustrated by arrow 410. This prompt gesture can be effective to cause the prompt object 404 having one or more options 406, 408 to be displayed. Additionally, this prompt gesture can be effective to cause the assisted location object 304 to be removed from the display and the cursor location function to be ended.

Subsequent to the prompt object 404 and the options 406, 408 being displayed, one or more of the options may be selected to initiate a corresponding function. For example, the text select option 406 may be selected via a motion select gesture. The motion select gesture can include a push-pull gesture that pushes away from the prompt object 404 toward a particular option and pulls back toward to the prompt object 404, as illustrated by arrows 412 in the center image of FIG. 4. In this way, the selected option is effectively dragged into the prompt object 404, and the prompt object 404 is replaced by the selected option. An example of this is shown in the bottom image of FIG. 4, which illustrates the prompt object 404 having been replaced by the selected option 414, which in this example is the text select option 406. Additionally the text paste option 408 may be selected in a similar manner as described for selection of the text select option 406.

In at least some embodiments, a replacement for the prompt object 404 can be modified to change one or more attributes of the selected option to indicate which option was selected and which corresponding function is active. Examples of modifications to the selected option include changes to font (e.g., size, color, format, font type, highlighting, and so on), paragraph (e.g., spacing, alignment, and so on), or other modifications to visually indicate the selection.

The function can be canceled via a gesture that pushes or pulls toward the cursor object 202 from the selected option. A push gesture that pushes back toward the cursor object 202 from the selected option 414 causes the display of the prompt object 404, or the selected option 414, and the corresponding options to be removed.

Figure 5:
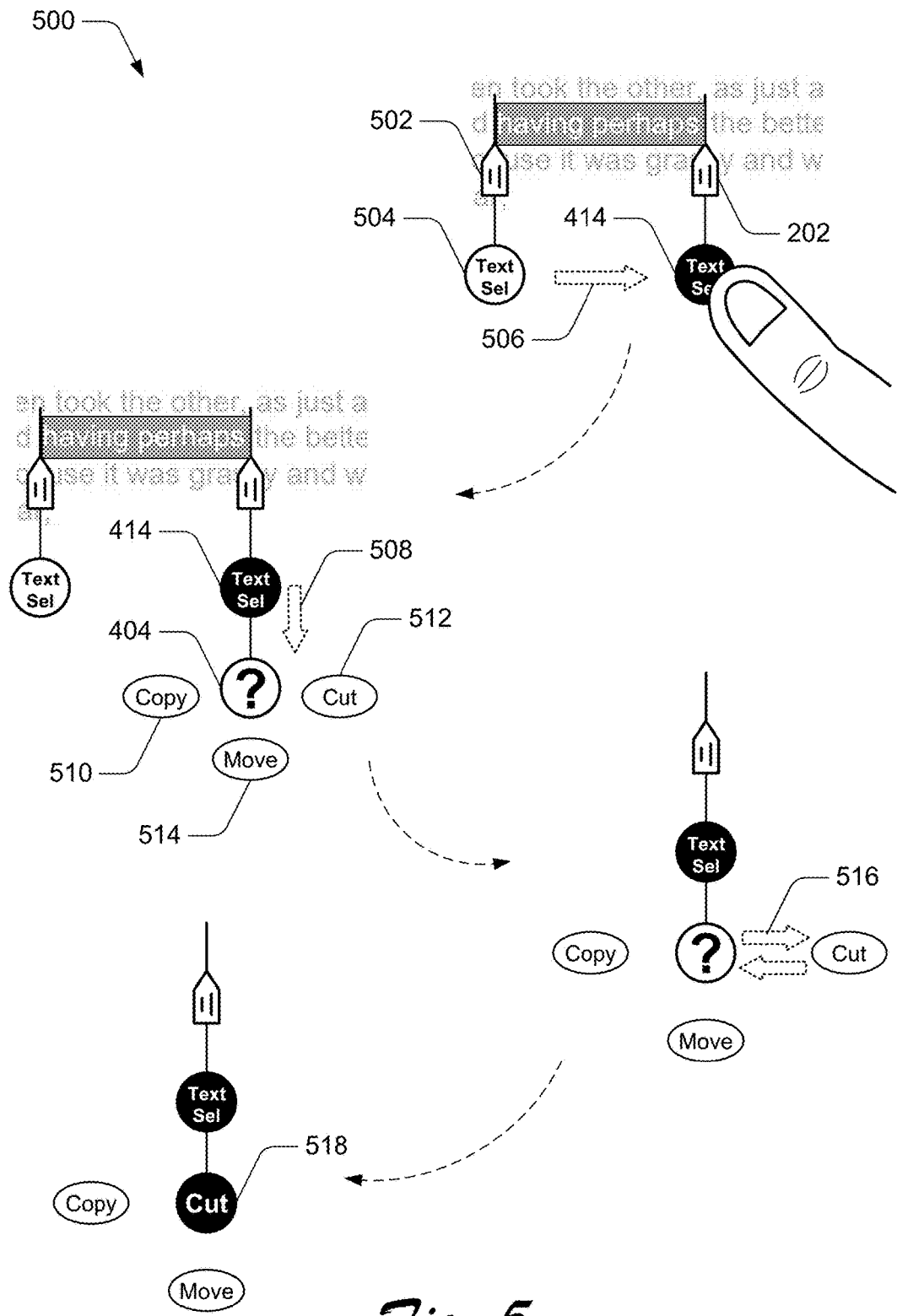
FIG. 5 is an illustration of an example implementation in which techniques for push-pull type gestures are employed in accordance with a text select gesture, a prompt gesture, and/or a motion select gesture.

Consider now FIG. 5, which is an illustration of an example implementation 500 in which techniques for push-pull type gestures are employed in accordance with a text select gesture, a prompt gesture, and/or a motion select gesture. Continuing with the above example, subsequent to the text select option 406 being selected, text on the display device can be selected by moving the selected option 414. One example of this is shown by example arrow 506.

As the selected option 414 is moved, an additional cursor object 502 is generated and displayed, along with a corresponding additional text select option 504, to indicate one end of the selection, such as a starting point or an ending point. The user can freely move either or both of the two displayed cursor objects 202, 502 by moving the selected option 414 and/or the additional text select option 504 to specify starting and ending points for the selection of the text. Additionally, as the cursor objects 202, 502 are moved, text in between the cursor objects 202, 502 is highlighted or otherwise modified to indicate the selection of such text.

Once the text is selected, the user may input an additional prompt gesture by dragging away from one of the selected option 414 or the additional text select option 504. One example is illustrated in FIG. 5 by example arrow 508, which represents a prompt gesture pulling down from the selected option 414. The prompt gesture can be effective to cause display of the prompt object 404 having one or more selectable options. The selectable options can include options representing functions that are operable using the selected text, such as copy 510, cut 512, move 514, and so on. These selectable options can include options that are different than the options described in FIG. 4 based on the text having been selected and being usable as input to functions corresponding to the options 510, 512, and 514.

As described above, one or more of the selectable options 510, 512, and 514 can be selected via a motion select gesture. For example, if a user wishes to select the cut 512 option, the user may input a motion select gesture from the prompt object 404 toward the cut option 512 and back toward the prompt object 404, as illustrated by example arrows 516. Based on the motion select gesture, the prompt object 404 is then be replaced by a modified version of the selected option, such as modified cut option 518, as shown in the lower left image of FIG. 5. In addition, a function corresponding to the selected option can be initiated, such as a cut function associated with the modified cut option 518. In implementations, the initiated function can use the selected text as input. Continuing with the illustrated example, the cut function can be initiated to cut the selected text from the display device. In one embodiment, the cut function is executed automatically, responsive to the selection of the cut option 512. Alternatively, the cut function can be executed responsive to a user input. In at least some embodiments, the user input may include a click, a double-click, or an interrupt (e.g., lifting the finger off of the display device).

If the user desires to change which function is active, the user may input a motion select gesture from the modified cut option 518 toward another of the displayed options. An example of this is described in relation to FIG. 6.

Figure 6:
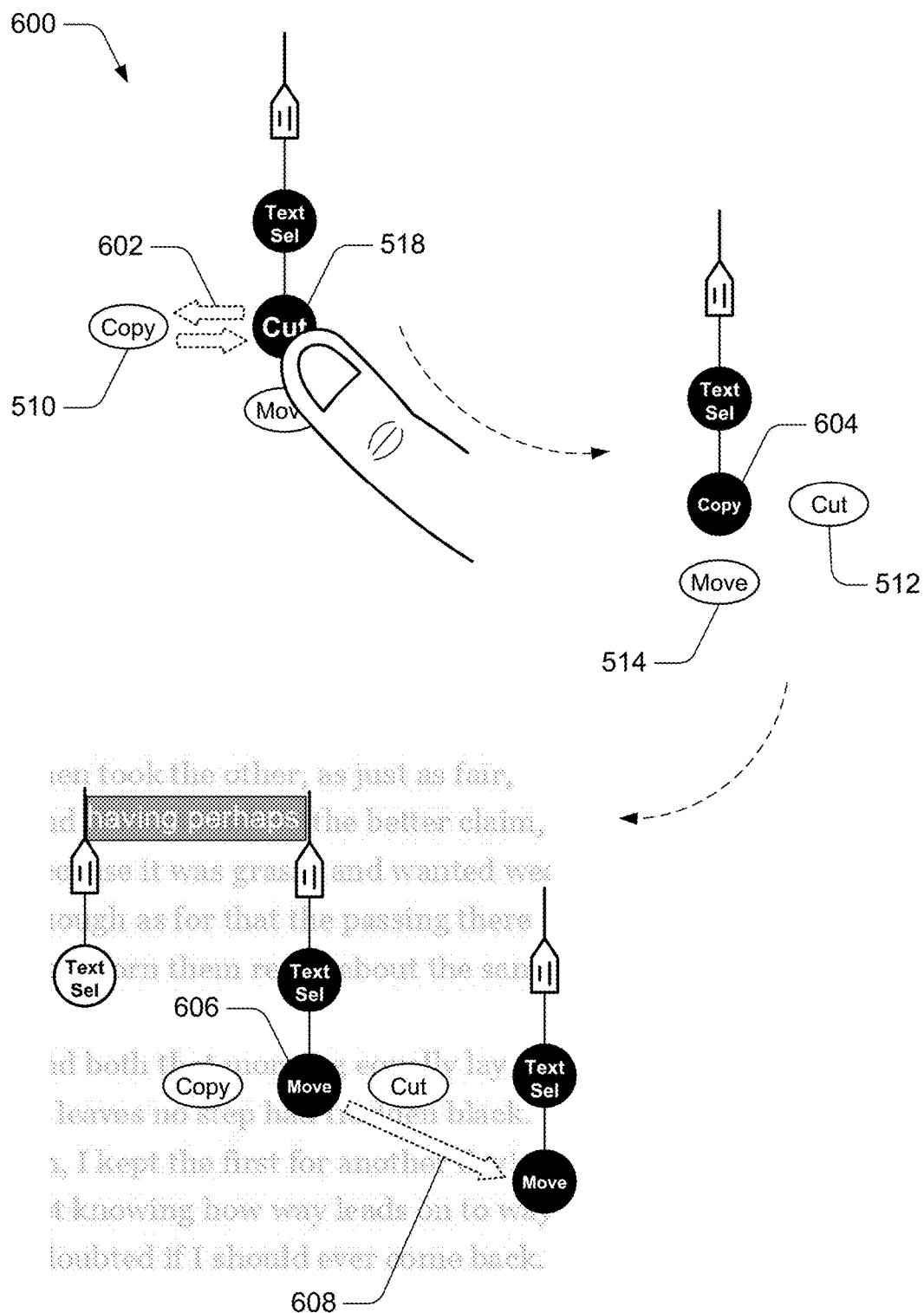
FIG. 6 is an illustration of an example implementation in which techniques for push-pull type gestures are employed in accordance with one or more embodiments.

FIG. 6 is an illustration of an example implementation 600 in which techniques for push-pull type gestures are employed in accordance with one or more embodiments. Continuing with the previous example, the user may have previously selected the cut option, causing the modified cut option 518 to replace the prompt object, but now wishes to change the function. In order to cancel the cut function and initiate another function, such as the copy function 510, the user may input a motion select gesture to select the copy option 510, as illustrated by arrows 602. In response to selection of the copy option 510, the modified cut option 518 is replaced with the selected copy option 604. The selected copy option 604 can be modified to visually indicate selection of the copy option. Accordingly, a corresponding copy function can be initiated to copy the selected text. In at least some embodiments, the copy function can be executed automatically in response to the selection of the copy option 510. Alternatively, the copy function can be executed in response to an input, such as a click, a double-click, or an interrupt.

In implementations, when a new option is selected, the previously selected option is re-displayed. For example, when the modified cut option 518 is replaced with the selected copy option 604, the cut option 512 is re-displayed as one of the selectable options.

In at least some embodiments, the user may input a motion select gesture to select the move option 514. In response to selection of the move option 514, the prompt object 404, or a modified version of the prompt object 404, is replaced by the selected move option 514. For example, FIG. 6 shows a modified version 606 of the move option 514 having replaced the previously selected copy option 506. Accordingly, a move function can be initiated to enable the user to move the selected text to a new location by moving the modified version 606 of the move option 514, an example of which is shown by arrow 608.

Other functions may also be available based on selection of the text. For example, in some embodiments, the selected text can be automatically divided into a plurality of sections, such as columns and/or rows. Further details are discussed in relation to FIGS. 7 and 8.

Figure 7:
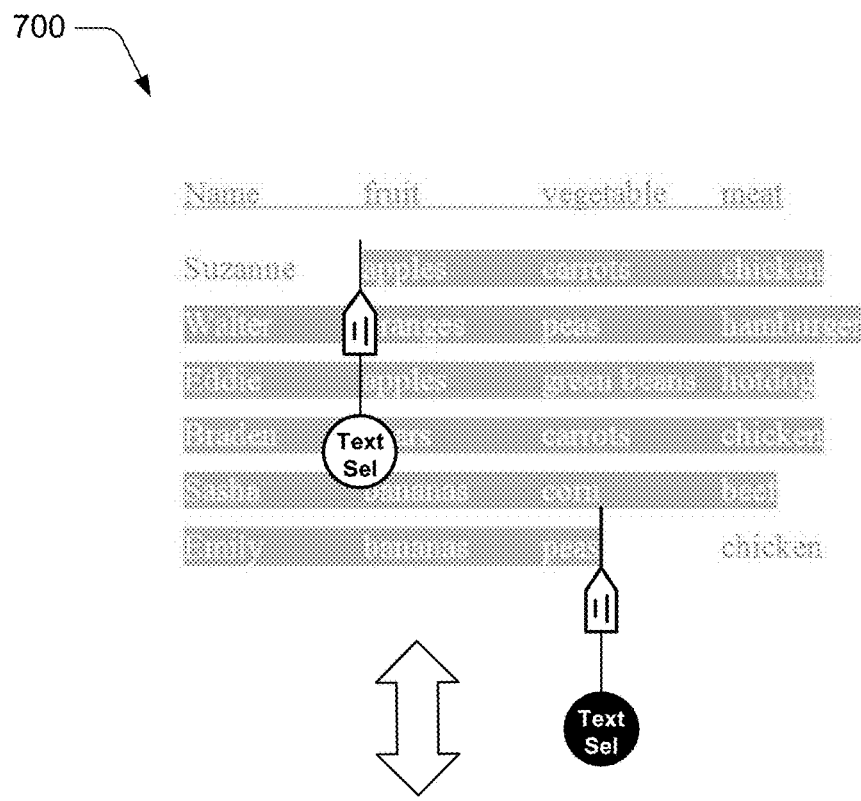
FIG. 7 is an illustration of an example implementation in which techniques for push-pull type gestures are employed in accordance with a text select gesture.
Figure 7:
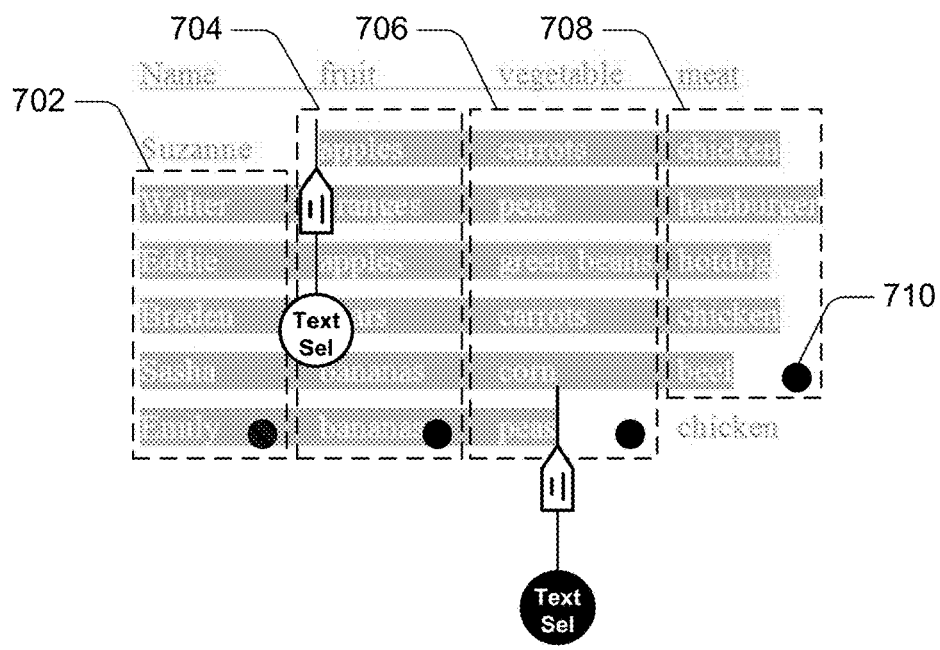

FIG. 7 is an illustration of an example implementation 700 in which techniques for push-pull type gestures are employed in accordance with a text select gesture. In at least some embodiments, selected text can be automatically divided into multiple sections. Any number of sections may be utilized. The sections may be columns, rows, or any combination thereof. The upper image in FIG. 7 illustrates text having been selected via the text select function. The lower image of FIG. 7 illustrates the selected text divided into four example sections (e.g., sections 702, 704, 706, and 708). Any number of sections may be utilized. In one example, the number of sections can correspond to a number of columns in a table in the text. In other embodiments, the number of sections utilized can correspond to one or more attributes of the selected text, such as a format or other layout property of the selected text. For example, in the lower image of FIG. 7, the four sections 702, 704, 706, and 708 correspond to four columns in the selected text.

In addition, each section can be selectable to include or exclude as input to a subsequent function. In some embodiments, the sections can include an indicator (e.g., an icon, an image, a button, text, and so on), that indicates to the user that a corresponding section is to be included or excluded as input to a subsequent function. For example, section 708 includes an indicator 710 that is selectable to unselect section 708 from the selected text, an example of which is shown in FIG. 8.

Figure 8:
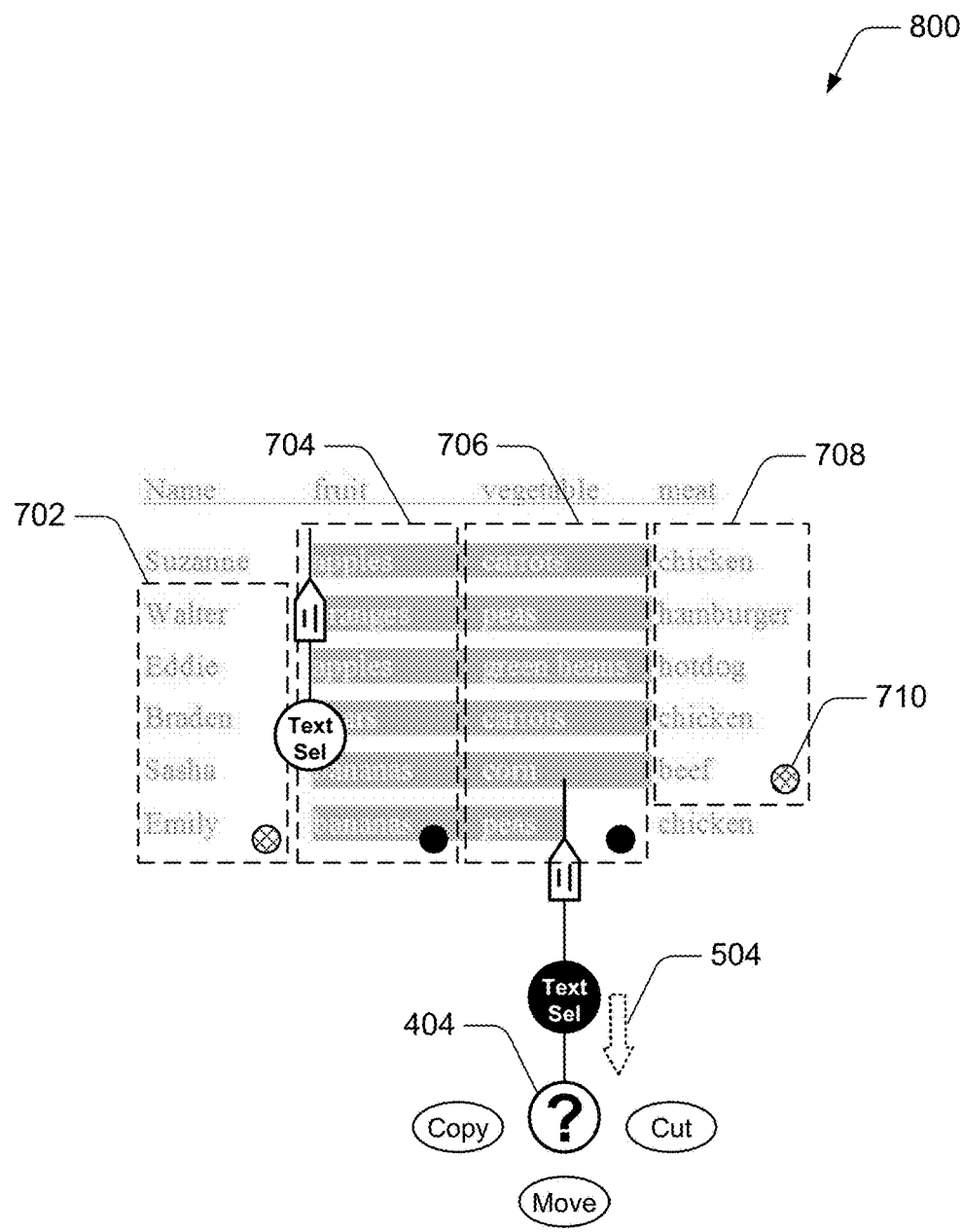
FIG. 8 is an illustration of an example implementation in which techniques for push-pull type gestures are employed in accordance with a text select gesture and/or a prompt gesture.

FIG. 8 is an illustration of an example implementation 800 in which techniques for push-pull type gestures are employed in accordance with a text select gesture. Continuing with the above example, assume the user has unselected section 708 by selecting the indicator 710. In response to selection of the indicator 710, the text in section 708 that was previously selected is unselected. In at least some embodiments, a section may be selected or unselected based on an input anywhere inside the boundaries of the section. In addition, the indicator 710 can be modified to correspond to the section 708 that has been unselected to indicate that the text in the section 708 is not selected. Similarly, the user has in this example unselected section 702. Accordingly, the remaining sections 704 and 706 that are selected can be utilized as input to a subsequent function.

In implementations, one or more of the sections can be modified by moving a boundary of a respective section to customize the selection area. For example, a section can be increased in size to include additional text in the section, thereby selecting the additional text to be included in the input for the subsequent function. Alternatively, the section can be decreased in size to exclude text that was previously included in the section, thereby causing the excluded text to be unselected.

In implementations, the user may initiate display of the prompt object 404 via a prompt gesture, as described above in relation to FIGS. 4 and 5. The prompt object 404 can include one or more options that are selectable to perform a function using the selected text as input. Because sections 702 and 708 were unselected in the above example, only sections 704 and 706 are used as input to a selected function, such as copy, cut, move and so on. In at least some embodiments, the selected function is initiated when the user removes the input item from the display device. For example, if the user selects the copy option 510, then the selected text is copied when the user lifts the finger off of the display device. Other functions can also be executed based on an interrupt, examples of which are described above. Alternatively, the user may provide an additional input such as a click or double-click to execute the function.

As mentioned above, the features and functions discussed herein may be performed in series without lifting the input item from the display device, such that the gestures are input as a continuous input without interruption. Alternatively, one or more of the functions may be initiated after an interrupt, such as the input item being removed from contact with the display device. In at least some embodiments, one or more of the options may be selectable via a menu, allowing the user to pick up the finger and then click or double click an option from the menu.

Having discussed various embodiments and structures, consider now a discussion of example procedures in which push-pull type gestures may be implemented.

Example Procedures

The following discussion describes techniques for push-pull type gestures that may be implemented according to one or more embodiments. In at least some embodiments, the techniques for push-pull type gestures may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. Further, although various different procedures are described herein, a combination of the described procedures may be employed to implement techniques for push-pull type gestures. In portions of the following discussion, reference will be made to the environment 100 of FIG. 1.

Figure 9:
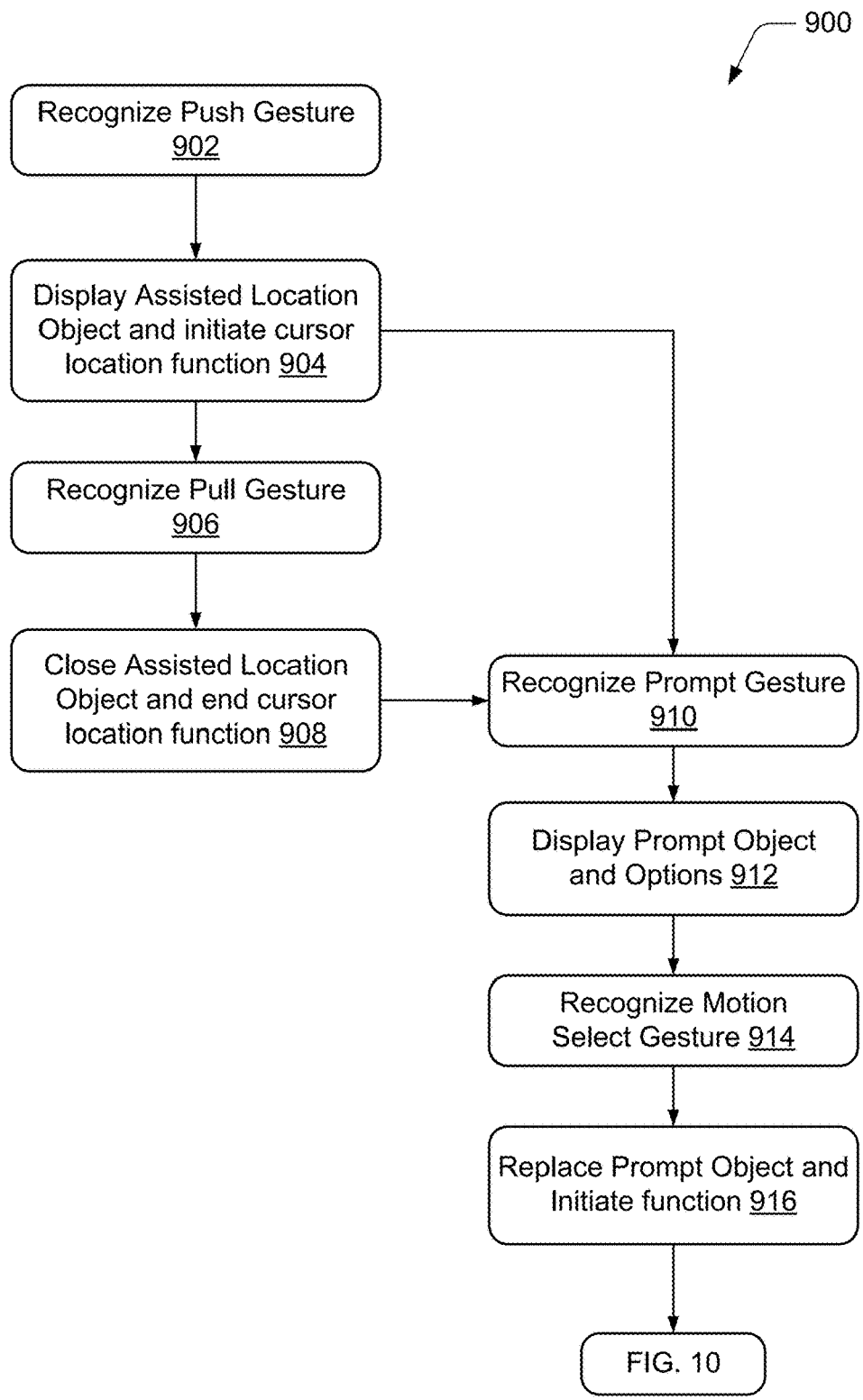
FIG. 9 is a flow diagram depicting a procedure in an example implementation in which push-pull type gestures are employed in accordance with one or more embodiments.

FIG. 9 is a flow diagram depicting a procedure 900 in an example implementation in which techniques for push-pull type gestures are employed in accordance with one or more embodiments. A push gesture is recognized (block 902). For example, a push gesture is recognized away from a cursor object displayed by a display device.

An assisted location object is displayed and a cursor reposition function is initiated (block 904). Any suitable object may be utilized to represent the assisted location object. For example, the assisted location object may be displayed as a shape, an image, text, an icon, or any other suitable object usable as a target for an input item to contact the display device. In addition, the cursor location function may be initiated to enable the user to reposition the cursor. In implementations, the cursor may be repositioned based on the assisted location object being dragged to a new location on the display device.

In an embodiment, a pull gesture is recognized (block 906). For example, a pull gesture may be recognized toward the cursor object from the assisted location object, examples of which are described above. The assisted location object is removed and the cursor location function is ended (block 908). For example, the pull gestures can be recognized as an indication that the cursor object is currently in the intended or desired location on the display device. Accordingly, responsive to the pull gesture, the assisted location object can be removed from the display, and the cursor location function can be ended.

A prompt gesture is recognized (block 910). This step can be performed in any suitable way. For example, the prompt gesture can be recognized subsequent to the close of the assisted location object, or prior to and without receiving the pull gesture. In some embodiments, the prompt gesture may be recognized while the cursor location function is active and the assisted location object is displayed, examples of which are described above.

A prompt object and options are displayed (block 912). For example, responsive to the prompt gesture, the prompt object may be displayed to prompt the user to select one or more options corresponding to a function. In implementations, the prompt object may include one or more options that represent different functions, such as a text select function or a text paste function.

A motion select gesture is recognized (block 914). For example, a motion select gesture may select one of the options displayed with the prompt object. The prompt object is replaced and a function is initiated (block 916). For example, responsive to the motion select gesture selecting a particular option, the prompt object is replaced with the selected option. In at least some embodiments, the replacement may include a modified version of the selected option, such as a highlighted version. In addition, based on the selection, a function is initiated that corresponds to the selected option. For example, if a text select option is selected, then a text select function is initiated to enable the user to select text that is displayed on the display device. If, however, a paste option is selected, then a paste function is initiated to enable the user to paste previously copied data or text. Depending on which option was selected, a variety of different paths may be taken, examples of which are illustrated in FIG. 10.

Figure 10:
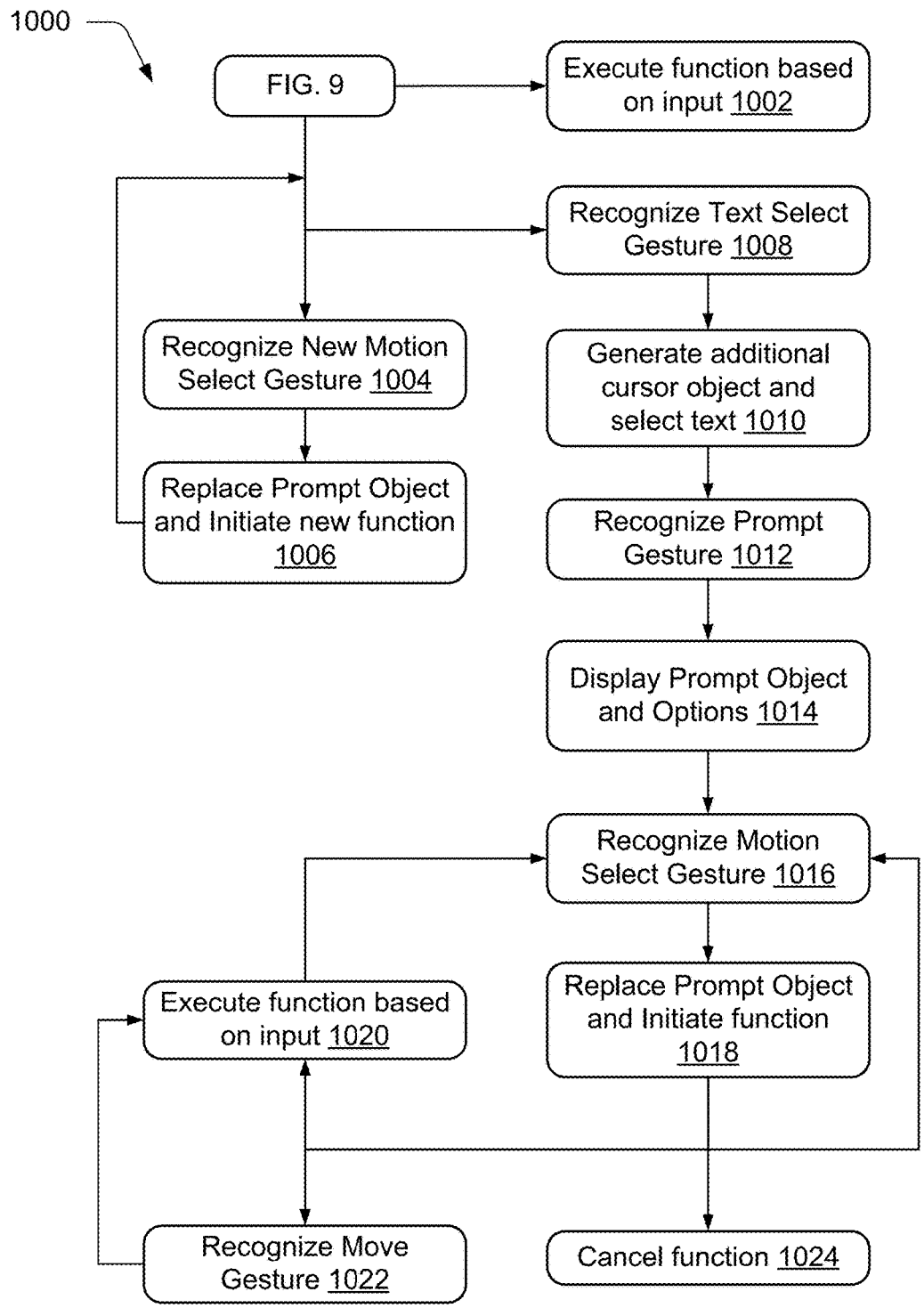
FIG. 10 is a flow diagram depicting a procedure in an example implementation in which push-pull type gestures are employed in further detail in accordance with FIG. 9.

FIG. 10 is a flow diagram depicting a procedure 1000 in an example implementation in which techniques for push-pull type gestures are employed in accordance with one or more embodiments. In one example, the intended function may be executed based on an input (block 1002). For instance, if the paste option was selected and the paste function initiated, then the paste function may be executed responsive to an input, such as the user's finger being removed from contact with the display device.

Alternatively, a new motion select gesture is recognized (block 1004). In this way, a different option is selected, causing a different function to be initiated. For example, if the paste function was first selected, then a new motion select gesture can be used to select the text select function, or vice versa. If a new motion select gesture is recognized, then the prompt object is replaced and a new function is initiated, examples of which are described above. Additionally, the previously selected option is re-displayed and made available for re-selection. Accordingly, the user can continue to select a new option or re-select a previously selected option without limitation on a number of attempts.

An additional path to take depends on whether the text select function was initiated in block 916 or block 1006. Here, a text select gesture is recognized (block 1008). For example, the text select gesture may be effective to select one or more characters of text on the display device. As described in more detail above, the replaced prompt object can be dragged using an input item.

An additional cursor object is generated and text is selected (block 1010). For example, the text select gesture may be effective to cause an additional cursor and corresponding additional prompt object to be generated. Additionally, the text select gesture may cause text in between the cursor and the additional cursor to be selected. In at least some embodiments, selection of the text in between the two cursors can be indicated via highlighting or other visual modification of the selected text.

A prompt gesture is recognized (block 1012). This step can be performed in any suitable way, examples of which are described above. A prompt object and options are displayed (block 1014). For example, responsive to the prompt gesture being recognized, the new prompt object is generated for display along with one or more options that correspond to functions that are operable using the selected text as input. In at least some embodiments, the options generated may include cut, copy, or move options. Additional options are also contemplated, such as modifications to one or more characteristics, such as font, paragraph, format, and so on.

A motion select gesture is recognized (block 1016). For example, a motion select gesture is recognized effective to select one of the options. The prompt object is replaced and a function initiated (block 1018). The selected option may replace the prompt object, as described in further detail above, and a corresponding function may be initiated.

Depending on which function was initiated in block 1018, a variety of paths may be taken. According to one path, if the initiated function is executable based on an input, such as an interrupt, click, or double click, then the function may be executed based on the input (block 1020). For example, a cut function or a copy function may be performed on the selected text responsive to the user lifting the finger off of the display device. Alternatively, the user may click or double click on the cut function or the copy function from a menu. Following execution of the function, a new option may be selected via a new motion select gesture (return to block 1016). For example, subsequent to executing a copy or cut function, the user can input a new motion select gesture to select a cursor location option and/or a paste option to move the cursor and/or paste the copied/cut text.

In at least one embodiment, if the initiated function is executable with further input, such as a move function, then the method may continue to block 1022, where a move gesture is recognized. Here, the prompt object that has been replaced with the move option is moved, causing one or more of the cursors to be moved. Then, the method returns to block 1020 where a function is performed based on an input. For example, once the cursor is in a desired location, a paste function can be performed responsive to the input item being removed from contact with the display device.

In yet another alternative, a new motion select gesture may be recognized to select a different option to change functions. Any of the options can be selected to change functions any number of times, as described above.

Another alternative is to cancel the function (block 1024). This step can be performed in any suitable way. For example, a push gesture or a pull gesture may be recognized toward the cursor object from the prompt object. As a result, the selected option and corresponding function may be canceled, and the display of the prompt object and the options may be removed from the display device.

The procedures described herein include a plurality of steps that may be performed as a continuous input, without removing the input item from contact with the display device. Alternatively, however, any of the steps described above may be performed via inputs that include a click, a double click, an interrupt, and so on. Having described procedures that are employable to implement the described techniques according to various embodiments, consider now a discussion of an example system and device employable to implement the described techniques.

Example System and Device

Figure 11:
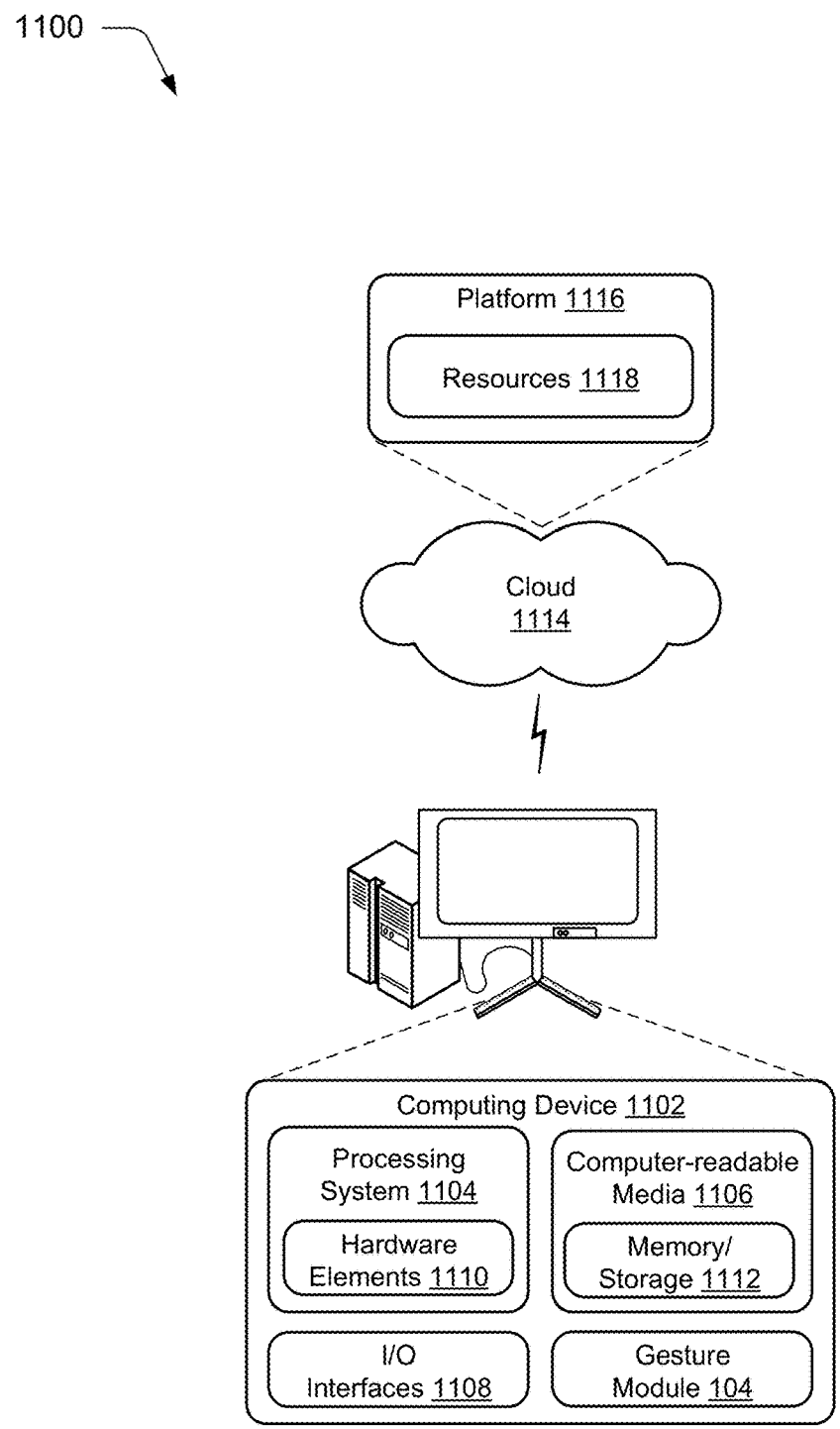
FIG. 11 illustrates various components of an example device that can be implemented as any type of computing device as described with reference to FIG. 1 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of gesture module 104, which may be configured to identify gestures and cause operations to be performed that correspond to the gestures. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

Cloud 1114 includes and/or is representative of a platform 1116 for resources 1118. Platform 1116 abstracts underlying functionality of hardware (e.g., servers) and software resources of the cloud 1114. Resources 1118 may include applications and/or data that can be utilized while computer processing is executed on servers that are remote from the computing device 1102. Resources 1118 can also include services 1120 provided over the Internet and/or through a subscriber network, such as a cellular or Wi-Fi network.

Platform 1116 may abstract resources and functions to connect computing device 1102 with other computing devices. Platform 1116 may also serve to abstract scaling of resources to provide a corresponding level of scale to encountered demand for resources 1118 that are implemented via platform 1116. Accordingly, in an interconnected device embodiment, implementation of functionality described herein may be distributed throughout system 1100. For example, the functionality may be implemented in part on computing device 1102 as well as via platform 1116 that abstracts the functionality of cloud 1114.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   recognizing a push gesture away from a cursor object displayed by a display device;
   displaying an assisted location object to assist a user in repositioning the cursor object;
   recognizing a prompt gesture effective to cause a prompt object having one or more options to be displayed, each of the one or more options being selectable to initiate a function that is operable using the cursor object;
   recognizing a motion select gesture that selects one of the one or more options effective to replace the prompt object and initiate a function corresponding to the selected said option;
   automatically dividing selected text into a plurality of vertical sections that are individually selectable to include or exclude when performing a subsequent function; and
   performing the subsequent function applied to one or more of the plurality of vertical sections that are selected to be included as inputs to the subsequent function.

2. The method of claim 1, further comprising:
   recognizing an additional motion select gesture that selects a different one of the one or more options; and
   replacing the selected said option with the selected different option.

3. The method of claim 1, wherein the function corresponding to the selected said option comprises a selectable function, the method further comprising:
   recognizing a selection gesture that selects displayed text; and
   initiating display of an additional cursor object that is user-selectable to select the displayed text that is displayed between the cursor object and the additional cursor object.

4. The method of claim 1, wherein one or more of the push gesture, the prompt gesture, and the motion select gesture are recognized as touch inputs.

5. The method of claim 1, wherein two or more of the push gesture, the prompt gesture, and the motion select gesture are recognized as a continuous touch input without interruption.

6. The method of claim 1, wherein the push gesture, the prompt gesture, and the motion select gesture are input without an input item being removed from contact with the display device.

7. The method of claim 1, further comprising recognizing a pull gesture that is pulled toward the cursor effective to one or more of close the assisted location object or end a cursor location function.

8. The method of claim 1, wherein the prompt gesture is initiated at the assisted location object and includes an arc motion directed partially around the cursor object.

9. The method of claim 1, wherein the function that is associated with the selected said option includes at least one of cut, copy, move, paste, or select.

10. The method of claim 1, further comprising performing the function responsive to an interruption of the motion select gesture.

11. The method of claim 1, further comprising automatically adjusting one or more characteristics of the assisted location object based on an input item used to input one or more of the push gesture, the prompt gesture, and the motion select gesture.

12. A system comprising:
   a memory configured to store a gesture module as computer-readable instructions; and
   one or more processors to implement the gesture module that is configured to:
   receive a prompt gesture effective to initiate a display of a command prompt having one or more selectable objects that each represent an action that is performable using a cursor;
   receive a motion select gesture that selects a first object of the one or more selectable objects effective to replace the display of the command prompt and initiate a first action represented by the selected first object, the prompt gesture and the motion select gesture being received without interruption between inputs; and receive an additional motion select gesture that selects a second object of the one or more selectable objects representing a second action that is different than the first action, the additional motion select gesture effective to cause the second object to replace the first object and initiate the second action.

13. The system of claim 12, wherein the selected first object represents one of a select action, a copy action, a paste action, a move action, or a cut action.

14. The system of claim 12, wherein the prompt gesture and the motion select gesture are received as a continuous touch input without interruption.

15. The system of claim 12, wherein the first action is operable to select text using the cursor, and wherein the gesture module is further configured to:
- receive a text select gesture recognized as selecting the text;
- modify the selected text to visually indicate that the selected text is selected; and
- automatically divide the selected text into a plurality of sections that are each selectable to be included or excluded in a subsequent action.

16. The system of claim 12, wherein the prompt gesture and the motion select gesture are received without an input item being removed from contact with a display device.

17. A non-transitory computer readable storage memory comprising stored instructions that, responsive to execution by one or more processors, cause the one or more processors to perform operations comprising:
- presenting an assisted location object based on recognition of a push gesture that pushes away from a cursor object displayed by a display device, the assisted location object configured to assist a user in repositioning the cursor object;
- presenting a prompt object having one or more selectable options based on recognition of a prompt gesture, the one or more selectable options being selectable to initiate a function;
- recognizing a motion select gesture that selects one said option from the one or more selectable options;
- replacing the prompt object with the selected said option;
- initiating the function that corresponds to the selected said option;
- automatically dividing selected text into a plurality of vertical sections that are individually selectable to include or exclude when performing a subsequent function; and
- performing the subsequent function applied to one or more of the plurality of vertical sections that are selected to be included as inputs to the subsequent function.

18. The computer readable storage memory of claim 17, wherein the push gesture, the prompt gesture, and the motion select gesture are received as a continuous touch input without interruption.

19. The computer readable storage memory of claim 17, wherein the push gesture, the prompt gesture, and the motion select gesture are input without an input item being removed from contact with the display device.

20. The computer readable storage memory of claim 17, wherein the operations further include recognizing a pull gesture that is pulled toward the cursor object effective to one or more of close the assisted location object or end a cursor location function.

* * * * *